United States Patent
Bil et al.

(10) Patent No.: US 7,458,779 B2
(45) Date of Patent: Dec. 2, 2008

(54) GAS TURBINE OR COMPRESSOR BLADE

(75) Inventors: Eric Stephen Bil, Chartrettes (FR);
Nicolas Hervy, Draveil (FR); Thomas Schlesinger, Suresnes (FR)

(73) Assignee: SNECMA, Paris (FR)

( * ) Notice: Subject to any disclaimer, the term of this patent is extended or adjusted under 35 U.S.C. 154(b) by 509 days.

(21) Appl. No.: 11/206,155

(22) Filed: Aug. 18, 2005

(65) Prior Publication Data
US 2007/0243067 A1    Oct. 18, 2007

(30) Foreign Application Priority Data
Aug. 23, 2004    (FR) .................................. 04 09038

(51) Int. Cl.
*F01D 11/00*    (2006.01)
(52) U.S. Cl. .................... 416/190; 416/191; 416/193 A
(58) Field of Classification Search ................ 415/190, 415/191, 193 A; 416/190, 191, 193 A
See application file for complete search history.

(56) References Cited

U.S. PATENT DOCUMENTS 835,473 A * 11/1906 Rotter ......................... 416/190
4,365,933 A * 12/1982 Langer et al. ............ 415/210.1

OTHER PUBLICATIONS

U.S. Appl. No. 11/206,156, filed Aug. 18, 2005, Bil et al.
U.S. Appl. No. 11/206,155, filed Aug. 18, 2005, Bil et al.
* cited by examiner

*Primary Examiner*—Igor Kershteyn
(74) *Attorney, Agent, or Firm*—Oblon, Spivak, McClelland, Maier & Neustadt, P.C.

(57) ABSTRACT

A gas turbine or compressor blade, includes a convex outer surface or suction side and a concave inner surface or pressure side, these sides being joined at their upstream ends by a leading edge and at their downstream ends by a trailing edge for the gases and terminating on a platform, one part of which includes a downstream fairing that includes at least one through-notch that extends substantially between a transverse line passing through the trailing edge and the downstream end of the fairing.

16 Claims, 1 Drawing Sheet

GAS TURBINE OR COMPRESSOR BLADE

The present invention relates to a rotor or stator blade for a gas turbine or compressor, and to a turbojet turbine or compressor comprising a plurality of these blades.

BACKGROUND OF THE INVENTION

A gas turbine or compressor blade comprises an aerofoil, defined by a convex outer surface or suction side and a concave inner surface or pressure side, these being joined together at their upstream ends by a leading edge and at their downstream ends by a trailing edge for the gases. The pressure side and the suction side terminate on a platform which may be provided with a blade root of the dovetail or fir-tree type intended to be inserted into a corresponding slot in a rotor disc of the gas turbine or compressor, when this is a rotor blade or moving blade.

In general, the platform has a fairing that extends towards the upstream end from the leading edge and a fairing that extends towards the downstream end from the trailing edge. The upstream and downstream fairings of the blade platforms serve, in conjunction with stator elements of the gas turbine or compressor, to limit, by a baffle effect, the flow of gas from the inside of the turbine or compressor radially towards the pressure and suction sides of the blades and, conversely, from the pressure and suction sides of the blades into the gas turbine or compressor. The upstream and downstream fairings therefore provide an important function, this having a direct influence on the head losses of the gas turbine or compressor and therefore on their efficiency.

In operation, the downstream fairings of the blade platforms, which are exposed to high temperatures, expand and deform relative to the aerofoils, thereby creating high stresses at the junctions between the blade aerofoils and the platforms.

These stresses are liable to weaken the blades and reduce their lifetime.

The object of the invention is in particular to provide a simple, inexpensive and effective solution to this problem.

SUMMARY OF THE INVENTION

The subject of the invention is a rotor or stator blade for a gas turbine or compressor, in which the action of the expansion and deformation of the downstream fairing on the joint region between the blade aerofoil and the platform is limited.

For this purpose, the subject of the invention is a gas turbine or compressor blade, comprising a convex outer surface or suction side and a concave inner surface or pressure side, these sides being joined at their upstream ends by a leading edge and at their downstream ends by a trailing edge for the gases and terminating on a platform, one part of which includes a fairing that extends towards the downstream end from the trailing edge, wherein said fairing includes at least one through-notch that extends right through its thickness or dimension along the longitudinal axis of the blade, from the downstream end of the fairing towards a transverse line passing through the trailing edge.

Advantageously, the notch extends from the downstream end of the fairing as far as the transverse line passing through the trailing edge.

This notch divides the fairing into two lateral parts, which expand and deform freely relative to each other, thereby reducing the stresses in the joint region between the blade aerofoil and the platform.

The number of notches is advantageously two or three, and the size, shape and orientation of each notch are determined so that the fairing is sufficiently flexible, while still maintaining its main function of sealing the gas flow region on the pressure and suction sides of the blades. The shape of the notches is, for example, substantially straight.

In a preferred embodiment of the invention, the notch closest to the trailing edge is approximately parallel to the downstream end of the suction side, and the or each notch is approximately parallel to the direction of gas flow in line with the notch. The notches therefore diverge from one another towards the downstream end.

Since they are oriented along the aerodynamic profile of the gas flow over the pressure sides of the blades, they cause little disturbance in the gas flow between the blades and do not create any head loss or turbulence liable to reduce the efficiency of the gas turbine or compressor.

According to another feature of the invention, the upstream end of each notch includes a cylindrical through-hole having a diameter greater than the width of this notch.

This hole allows the local stresses at the upstream end of the notch to be reduced and distributed, and avoids the risk of this end cracking.

The invention also proposes a turbine, wherein it comprises a plurality of blades, the downstream fairings of which include at least one of the aforementioned through-notches.

It also proposes a compressor equipped with blades of the aforementioned type.

The invention also relates to a turbomachine, such as an aircraft turbojet or turboprop engine, wherein it comprises a plurality of blades of the aforementioned type.

BRIEF DESCRIPTION OF THE DRAWINGS

Other advantages and features of the invention will become apparent on reading the following description, given by way of non-limiting example and with reference to the appended drawings in which.

DESCRIPTION OF THE PREFERRED EMBODIMENT

Figure 1:
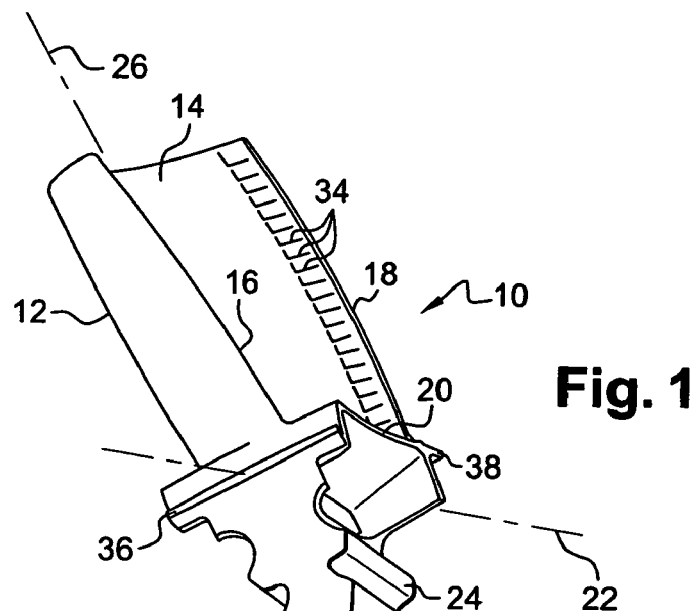
FIG. 1 is a schematic perspective view of a blade according to the invention, seen from below and from the upstream side.
Figure 2:
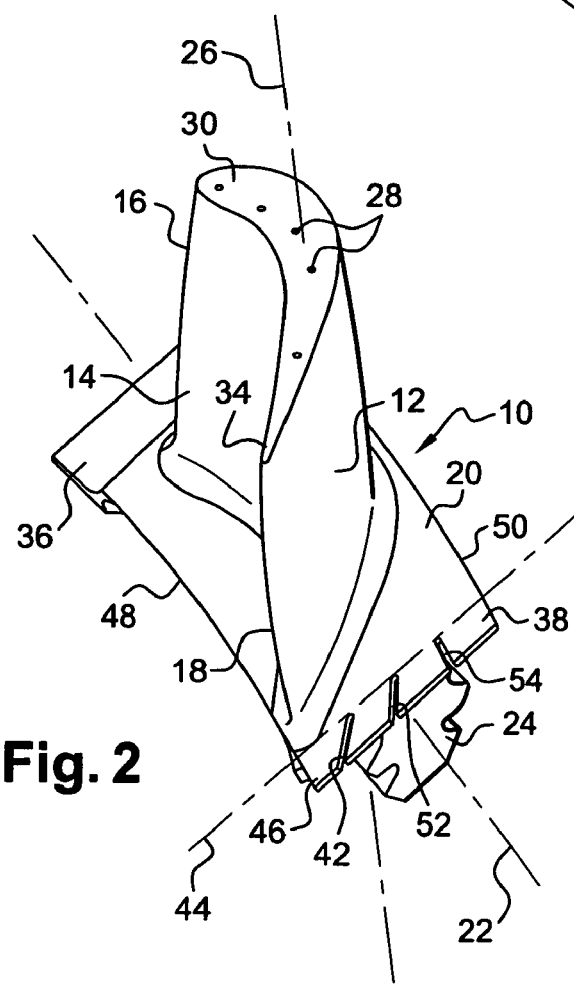
FIG. 2 is a schematic perspective view of the blade according to the invention, seen from above and from the downstream side.

The blade according to the invention, shown in FIGS. 1 and 2, is a rotor blade of a gas turbine or compressor, in particular of an aircraft turbojet or turboprop engine.

This blade 10 has a convex outer surface or suction side 12 and a concave inner surface or pressure side 14 that are joined together at their upstream ends by a leading edge 16 and at their downstream ends by a trailing edge 18 for the gases that flow in the gas turbine or compressor.

The blade 10 furthermore includes a substantially rectangular platform 20 of longitudinal axis 22, which joins the lower end of both the pressure side 14 and the suction side 12 to a root 24, by means of which the blade 10 is mounted on a rotor disc (not shown) of the gas turbine or compressor, by this root 24 being fitted into a cavity of corresponding shape on the periphery of the rotor disc.

Thanks to this male/female fitting, which is of the fir-tree type in the example shown, the blade 10 is retained radially on the rotor disc. Other means are provided for axially fastening the root 24 of the blade 10 in the disc cavity.

Each rotor disc comprises a plurality of blades 10 distributed uniformly around its external periphery and cooperating with stages of fixed stator blades placed between two rotor discs.

The blade 10 is internally ventilated and cooled by means of ducts that extend along the longitudinal axis 26 of the blade 10 and emerge via holes 28 at the tip 30 of the blade 10, on the opposite end from the root 24. These channels are supplied via holes 32 in the root 24 of the blade 10 and also include outlet slits 34 formed over part of the pressure side 14 close to the trailing edge 18.

The platform 20 extends towards the upstream end and towards the downstream end of both the suction side 12 and the pressure side 14 and forms an upstream fairing 36 and a downstream fairing 38. The fairings 36, 38 have an approximately circumferential orientation on the rotor disc and cooperate with corresponding elements of the fixed blade stages in order to limit the flow of gas from the inside of the gas turbine or compressor radially towards the suction 12 and pressure 14 sides of the blades 10 and, conversely, from the pressure 14 and suction 12 sides of the blades 10 into the gas turbine or compressor, so as not to reduce the efficiency of this machine.

In operation, the blades 10 of the discs are subjected to large centrifugal forces and to high temperatures, in particular when they are blades of a turbojet gas turbine that receive burnt gases coming from a combustion chamber upstream of the turbine. The thermal expansion of the downstream fairing results in deformation of the fairing relative to the aerofoil, thereby creating high stresses in the point between the aerofoil and the platform 20.

The invention makes it possible to limit these stresses by means of at least one through-notch 42, which is formed right through the thickness or dimension of the downstream fairing 38 along the longitudinal axis 26 of the blade 10, this notch 42 extending substantially between a transverse line 44 passing through the trailing edge 18 and the downstream end of the fairing 38.

The notch 42 lies near the suction side 12 and is straight and approximately parallel to that part of the suction side which joins the trailing edge 18.

Thanks to this notch 42, only the thermal expansion of the part 46 of the downstream fairing 38 lying between the notch 42 and the edge 48 of the platform 20, which is joined to the trailing edge 18, can exert a stress in the joint where the aerofoil joins the platform 20. The thermal expansion of the other part of the downstream fairing 38, lying between the notch 42 and the opposite edge 50 of the platform 20, has practically no effect on this joint region.

There may be any number of notches in the downstream fairing, for example two or three notches as shown, the other notches 52, 54 extending between the aforementioned transverse line 44 and the edge of the downstream fairing 38 and being approximately parallel to the gas flow lines near the suction side 12. These notches 42, 52, 54 therefore diverge from the line 44 towards the downstream end.

Under these conditions, the cooling air that circulates beneath the platforms 20 in the roots 24 of the blades 10 can flow via the notches 42, 52, 54 and mix with, without excessively disturbing it, the flow of gas circulating in the compressor or turbine.

Figure 3:
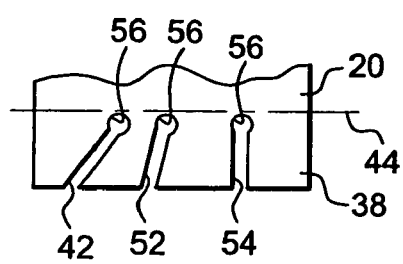
FIG. 3 is an enlarged partial schematic view from above of the notches in the downstream fairing of this blade.

As shown in FIG. 3, the upstream end of each notch 42, 52, 54 is formed by a cylindrical through-hole 56 having a diameter greater than the width of this notch 42, 52, 54. This allows the stress concentrations at the upstream ends of the notches 42, 52, 54 to be reduced.

The notches 42, 52, 54 and the holes 56 may be produced by machining or by any other suitable technique.

The blade 10 according to the invention is particularly, but not exclusively, intended for a turbomachine compressor or turbine of the turboprop or turbojet type.

The invention claimed is:

1. A gas turbine or compressor rotor blade, comprising a convex outer surface or suction side and a concave inner surface or pressure side, said suction and pressure sides being joined at their upstream ends by a leading edge and at their downstream ends by a trailing edge for gases and terminating on a platform, said platform being substantially rectangular and comprising an upstream fairing extending upstream from the leading edge and defining an upstream edge of the platform, and a downstream fairing extending downstream from the trailing edge and defining a downstream edge of the platform, said upstream and downstream edges of the platform being joined at their ends by two lateral edges of the platform, wherein said downstream fairing includes at least one through-notch that extends right through its thickness or dimension along the longitudinal axis of the blade, from the downstream edge of the platform towards a transverse line passing through the trailing edge, wherein the at least one notch is configured to divide the downstream fairing into two lateral portions.

2. A rotor blade according to claim 1, wherein the at least one notch extends from the downstream edge of the platform as far as the transverse line passing through the trailing edge.

3. A rotor blade according to claim 1, wherein the at least one notch has a substantially straight shape.

4. A rotor blade according to claim 1, wherein said downstream fairing includes a plurality of through-notches and the notches diverge from one another towards the downstream edge of the platform.

5. A rotor blade according to claim 1, wherein a notch closest to the trailing edge is approximately parallel to the downstream end of the suction side.

6. A rotor blade according to claim 1, wherein the at least one notch is approximately parallel to the direction of gas flow in line with the notch.

7. A rotor blade according to claim 1, wherein said downstream fairing includes a plurality of through-notches and the upstream end of each notch includes a cylindrical through-hole having a diameter greater than the width of said each notch.

8. A rotor blade according to claim 7, wherein said holes are produced by machining.

9. A rotor blade according to claim 1, wherein said downstream fairing includes a plurality of through-notches and the notches are produced by machining.

10. A turbomachine turbine comprising a plurality of blades according to claim 1.

11. A turbomachine compressor comprising a plurality of blades according to claim 1.

12. A turbomachine comprising a plurality of blades according to claim 1.

13. A rotor blade according to claim 1, wherein said downstream fairing includes a plurality of through-notches formed in the downstream edges of the platform.

14. A gas turbine or compressor blade, comprising a convex outer surface or suction side and a concave inner surface or pressure side, said suction and pressure sides being joined at their upstream ends by a leading edge and at their downstream ends by a trailing edge for gases and terminating on a platform, one part of which includes a fairing that extends towards the downstream end from the trailing edge, wherein said fairing includes at least one through-notch that extends right through its thickness or dimension along the longitudinal axis of the blade, the at last one notch extending from the downstream end of the fairing as far as a transverse line passing through the trailing edge.

15. A gas turbine or compressor blade, comprising a convex outer surface or suction side and a concave inner surface or pressure side, said suction and pressure sides being joined at their upstream ends by a leading edge and at their downstream ends by a trailing edge for gases and terminating on a platform, one part of which includes a fairing that extends towards the downstream end from the trailing edge, wherein said fairing includes a plurality of through-notches that extends right through its thickness or dimension along the longitudinal axis of the blade, from the downstream end of the fairing towards a transverse line passing through the trailing edge, and wherein the notches diverge from one another towards the downstream end.

16. A gas turbine or compressor blade, comprising a convex outer surface or suction side and a concave inner surface or pressure side, said suction and pressure sides being joined at their upstream ends by a leading edge and at their downstream ends by a trailing edge for gases and terminating on a platform, one part of which includes a fairing that extends towards the downstream end from the trailing edge, wherein said fairing includes at least one through-notch that extends right through its thickness or dimension along the longitudinal axis of the blade, from the downstream end of the fairing towards a transverse line passing through the trailing edge, and wherein a notch closest to the trailing edge is approximately parallel to the downstream end of the suction side.

\* \* \* \* \*